US012688971B2

(12) United States Patent
Kim et al.

(10) Patent No.: US 12,688,971 B2
(45) Date of Patent: Jul. 21, 2026

(54) MULTILAYER ELECTRONIC COMPONENT

(71) Applicant: SAMSUNG ELECTRO-MECHANICS CO., LTD., Suwon-si (KR)

(72) Inventors: Hong Gi Kim, Suwon-si (KR); Ji Won Lee, Suwon-si (KR); Byeong Hyeop Ha, Suwon-si (KR); Jin Il Kang, Suwon-si (KR); Hong Seok Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 129 days.

(21) Appl. No.: 18/740,181

(22) Filed: Jun. 11, 2024

(65) Prior Publication Data

US 2025/0054697 A1 Feb. 13, 2025

(30) Foreign Application Priority Data

Aug. 7, 2023 (KR) ........................ 10-2023-0102619

(51) Int. Cl.
*H01G 4/232* (2006.01)
*H01G 4/30* (2006.01)
(52) U.S. Cl.
CPC .............. *H01G 4/232* (2013.01); *H01G 4/30* (2013.01)
(58) Field of Classification Search
CPC ........ H01G 4/232; H01G 4/30; H01G 4/0085; H01G 4/1227; H01G 4/002; H01G 4/12; H01G 4/2325; H01G 4/012; H01G 4/1209; Y02E 60/13
See application file for complete search history.

(56) References Cited

U.S. PATENT DOCUMENTS

| | | | | |
|---|---|---|---|---|
| 4,097,911 A * | 6/1978 | Dorrian | .................... | H01G 4/30 |
| | | | | 361/305 |
| 9,892,854 B2 * | 2/2018 | Nishisaka | ................ | H01G 4/30 |
| 12,488,943 B2 * | 12/2025 | Kim | ......................... | H01G 4/12 |
| 2010/0328842 A1 * | 12/2010 | Takeuchi | ................. | C25D 5/50 |
| | | | | 361/301.4 |

(Continued)

FOREIGN PATENT DOCUMENTS

| | | | |
|---|---|---|---|
| EP | 1783790 A1 | 5/2007 |
| JP | 2002217055 A | * | 8/2002 |

(Continued)

OTHER PUBLICATIONS

J. K. Kim, "PEG-assisted Sol-gel Synthesis of Compact Nickel Oxide Hole-Selective Layer with Modified Interfacial Properties for Organic Solar Cells," Polymers, vol. 11, 2019.

(Continued)

*Primary Examiner* — Dion R. Ferguson
(74) *Attorney, Agent, or Firm* — Morgan Lewis & Bockius LLP

(57) ABSTRACT

A multilayer electronic component includes a body including a dielectric layer and an internal electrode alternately disposed with the dielectric layer in a first direction; an external electrode disposed outside the body; and an oxide layer disposed between the body and the external electrode and connecting the internal electrode and the external electrode, wherein the oxide layer includes one or more of an Ni oxide and a Cu oxide.

18 Claims, 10 Drawing Sheets

(56)        References Cited

U.S. PATENT DOCUMENTS

| | | | |
|---|---|---|---|
| 2015/0136463 A1* | 5/2015 | Lee | H01G 4/232 |
| | | | 361/301.4 |
| 2016/0217930 A1 | 7/2016 | Yamaguchi et al. | |
| 2016/0268046 A1* | 9/2016 | Nishisaka | H01G 4/232 |
| 2017/0278635 A1 | 9/2017 | Mizuno et al. | |
| 2021/0202177 A1* | 7/2021 | Kurosu | H01G 4/008 |
| 2021/0375550 A1 | 12/2021 | Yatagawa et al. | |
| 2022/0293344 A1* | 9/2022 | Iguchi | H01G 4/1227 |
| 2023/0070629 A1 | 3/2023 | Lee et al. | |
| 2023/0148360 A1 | 5/2023 | Lee et al. | |
| 2024/0029954 A1* | 1/2024 | Seo | H01G 4/0085 |
| 2024/0222028 A1* | 7/2024 | Kim | H01G 4/12 |
| 2025/0054697 A1* | 2/2025 | Kim | H01G 4/232 |

FOREIGN PATENT DOCUMENTS

| | | | |
|---|---|---|---|
| JP | 2016-136557 A | 7/2016 | |
| JP | 2024014743 A * | 2/2024 | H01G 4/0085 |
| KR | 20130056569 A * | 5/2013 | H01G 4/30 |
| KR | 10-2017-0113118 A | 10/2017 | |
| KR | 20210060319 A * | 5/2021 | H10D 84/212 |
| KR | 10-2023-0031615 A | 3/2023 | |

OTHER PUBLICATIONS

N. Park, et al., "High Efficiency NiO/ZnO heterojunction UV photodiode by Sol-Gel processing," Journal of Materials Chemistry C, 2013.

Extended European Search Report dated Mar. 17, 2025 issued in corresponding European Patent Application No. 24181668.5.

* cited by examiner

【FIG. 1】
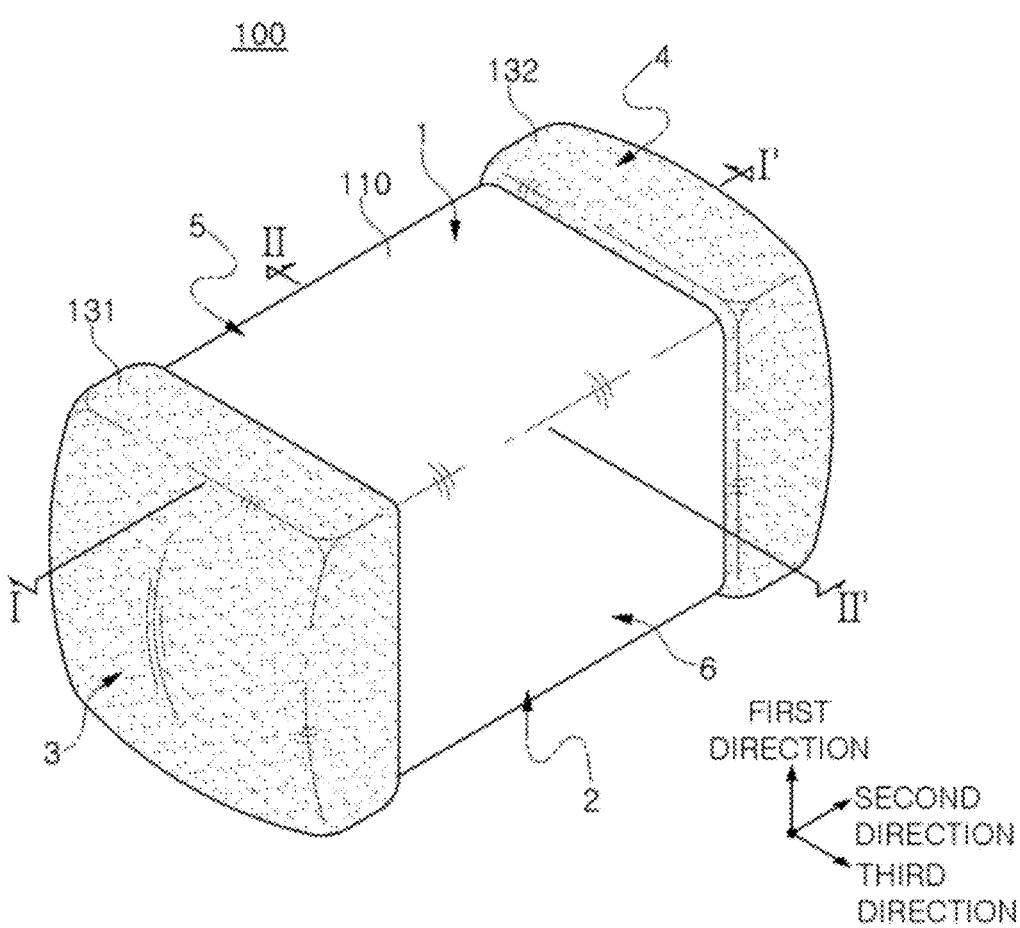

【FIG. 2】
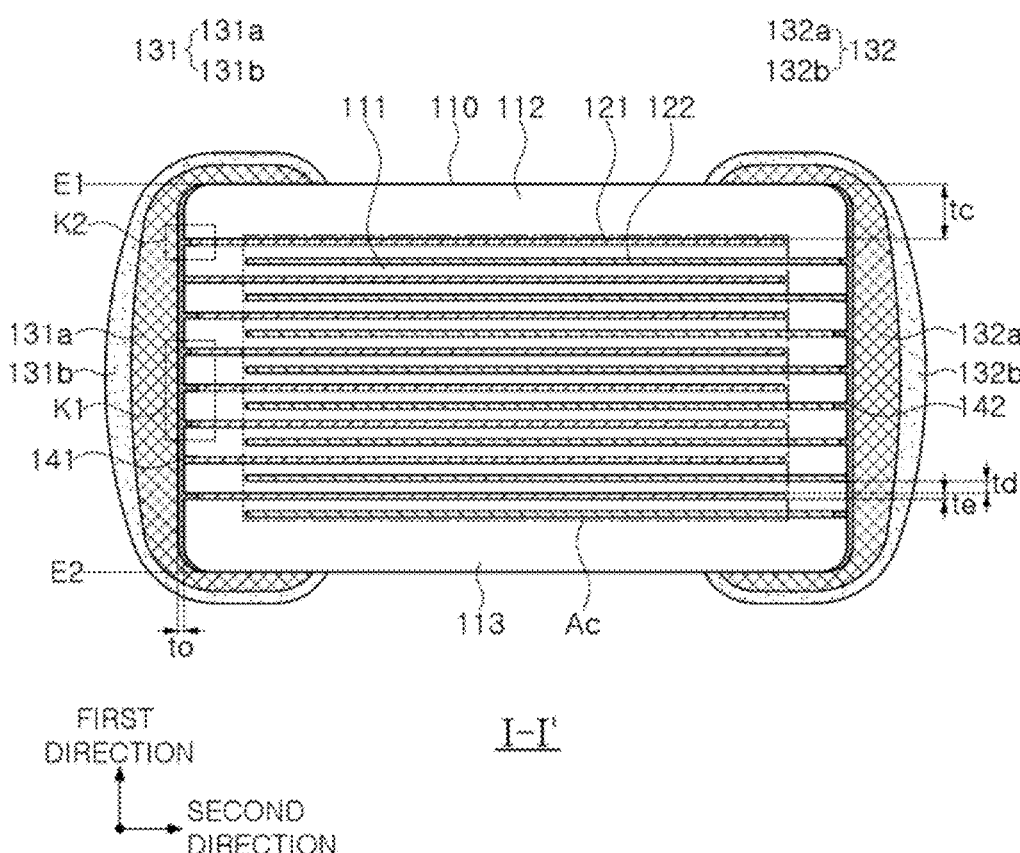
I-I'
FIRST
DIRECTION
SECOND
DIRECTION

【FIG. 3】
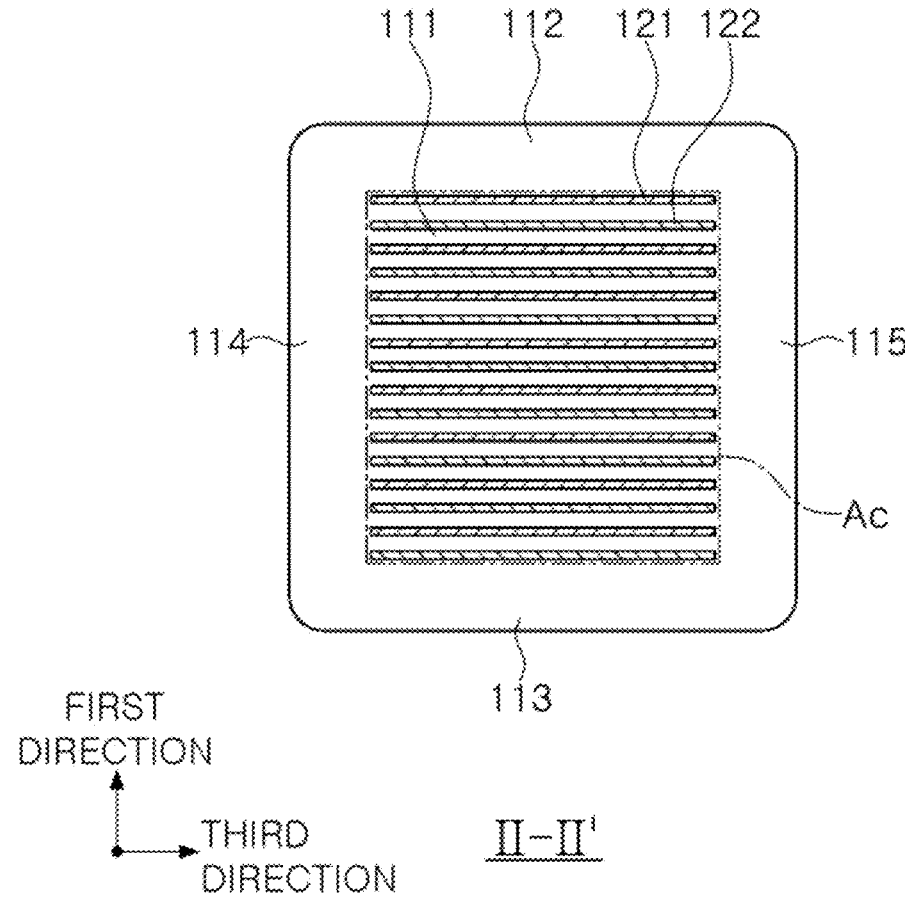
FIRST
DIRECTION
THIRD
DIRECTION
II−II'

【FIG. 4】
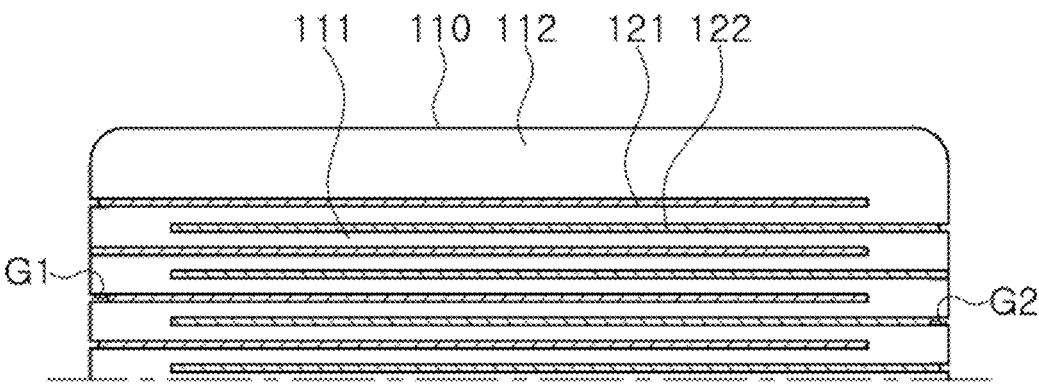

【FIG. 5】
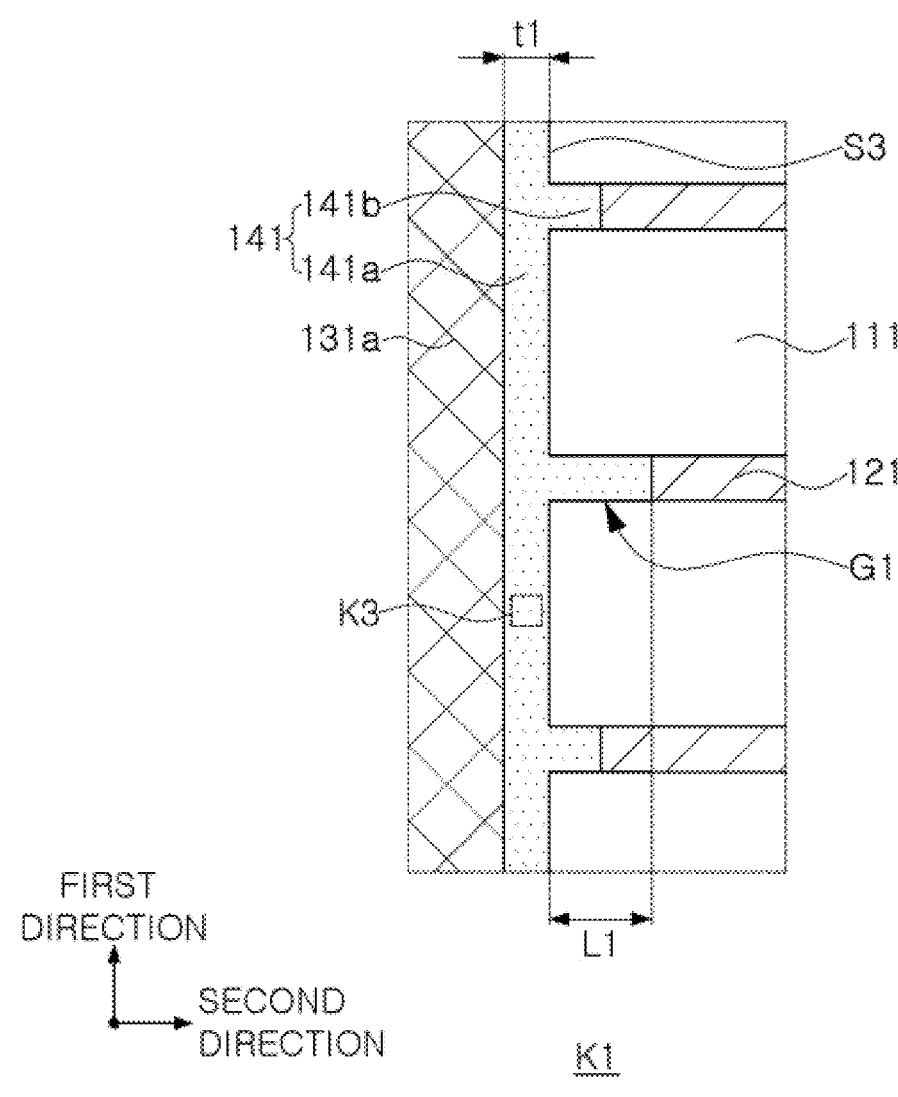

【FIG. 6】
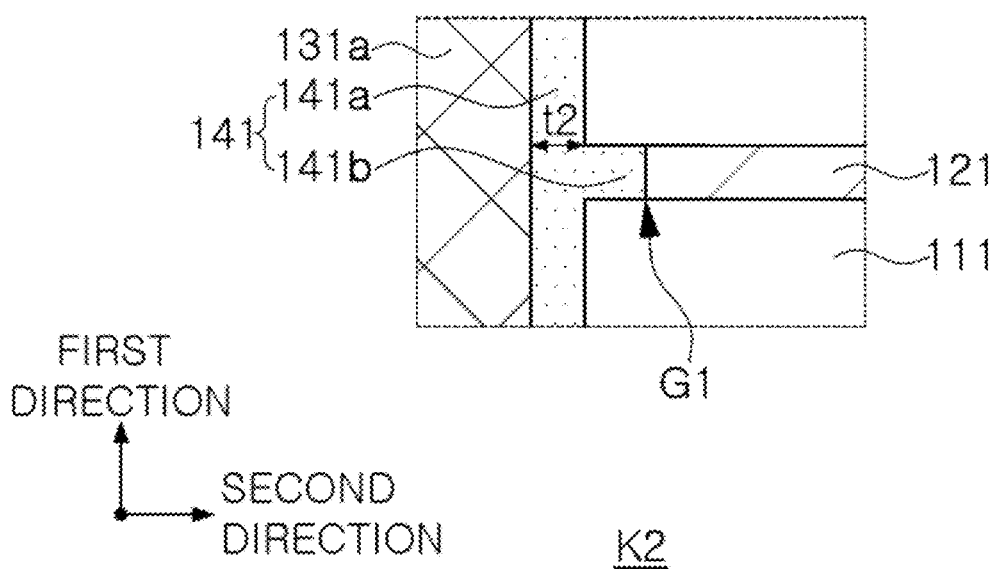
FIRST
DIRECTION
SECOND
DIRECTION
K2

【FIG. 7】
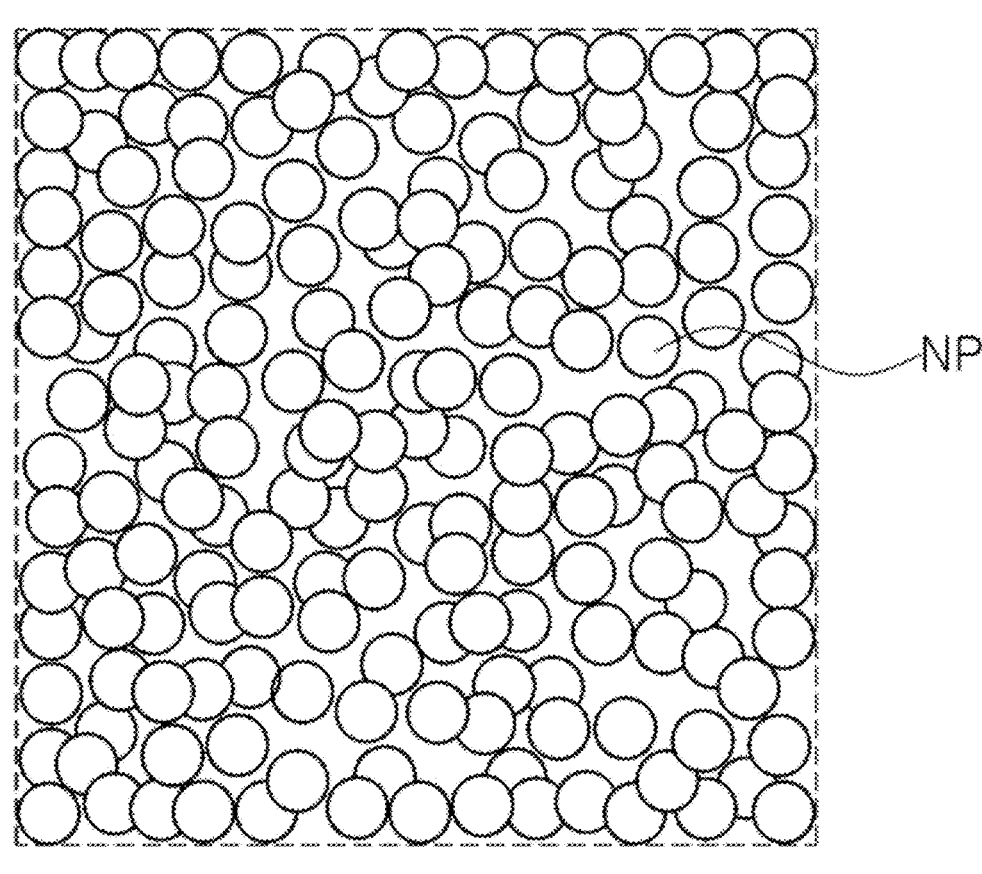
K3

【FIG. 8】
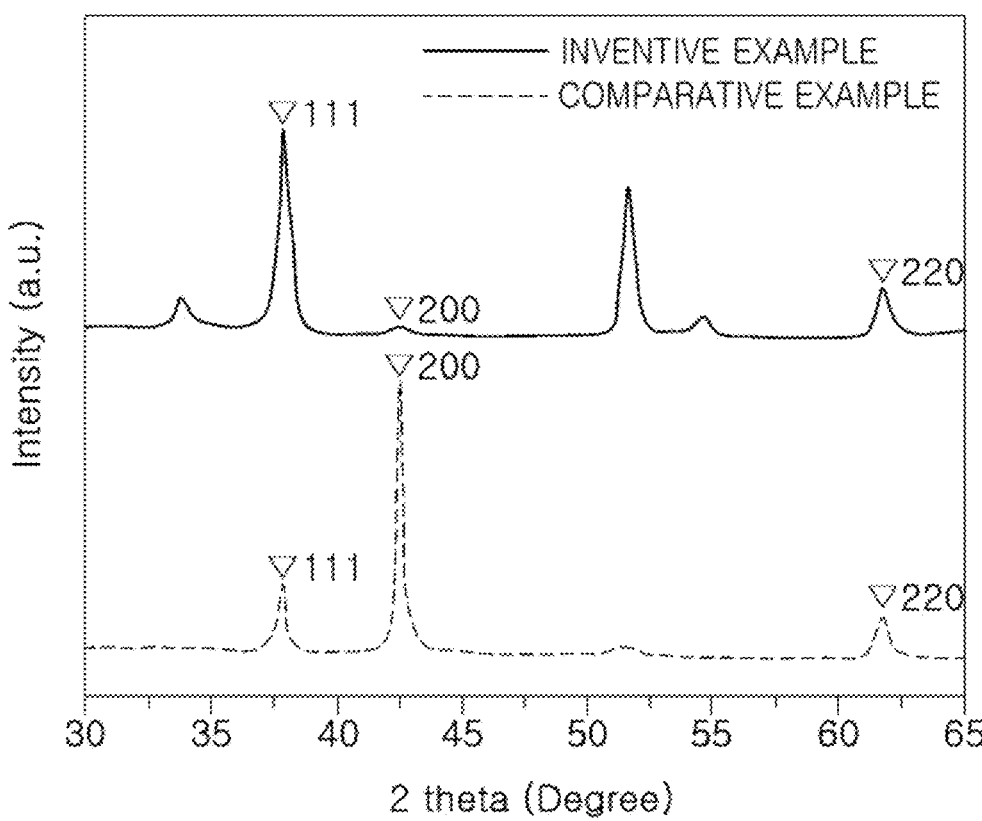

【FIG. 9】
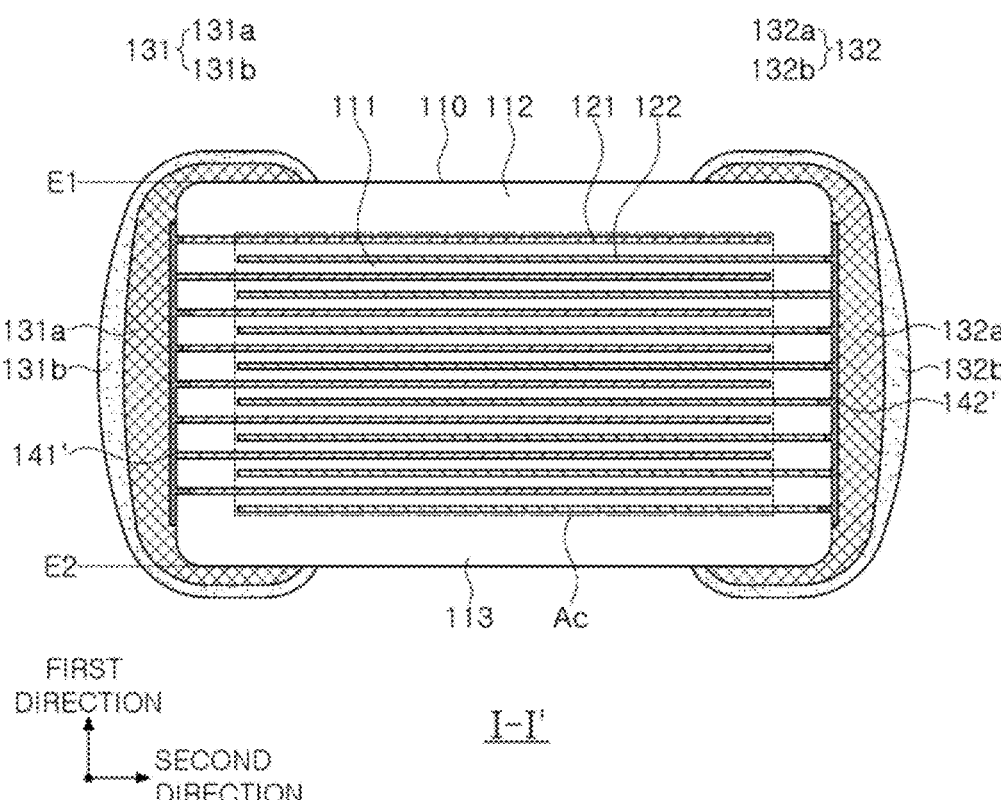

【FIG. 10】
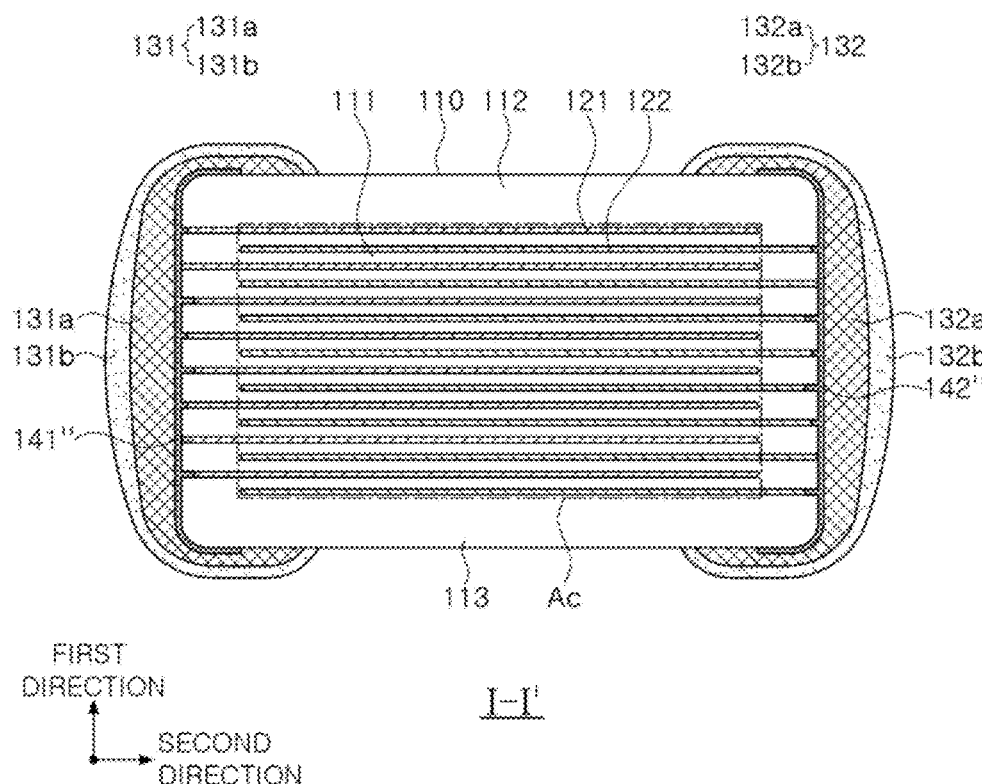

MULTILAYER ELECTRONIC COMPONENT

CROSS-REFERENCE TO RELATED APPLICATION(S)

This application claims benefit of priority to Korean Patent Application No. 10-2023-0102619 filed on Aug. 7, 2023 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, may be a chip-type condenser mounted on the printed circuit boards of any of various electronic products, such as an imaging device, including a liquid crystal display (LCD) or a plasma display panel (PDP), a computer, a smartphone, or a mobile phone, serving to charge or discharge electricity therein or therefrom.

The multilayer ceramic capacitor has a small size, implements high capacitance, and is easily mounted, and may thus be used as a component of various electronic devices. In particular, as various electronic devices such as a computer, a mobile device, or the like become smaller and have higher output, the demand for miniaturization and higher capacitance for multilayer ceramic capacitors is increasing.

However, with the recent miniaturization and higher capacitance of multilayer ceramic capacitors, the dielectric layers and internal electrodes of the multilayer ceramic capacitors are becoming thinner, making them more prone to deterioration with regard to changes in the external environment. Accordingly, a problem may occur in which moisture resistance reliability of the multilayer ceramic capacitor is deteriorated as external moisture or the like penetrates.

In addition, in general, in order to thin an internal electrode, it is necessary to use finer metal powder particles than before, but when finer metal powder particles are used, a shrinkage start temperature of the internal electrode may move to a lower temperature, so a difference in shrinkage behavior between the internal electrode and the dielectric layer may occur. In this case, since a shrinkage rate of the internal electrode may be greater than that of the dielectric layer, a problem may occur in which connectivity between the internal electrode and the external electrode is deteriorated.

Accordingly, research is needed on a structure of a multilayer ceramic capacitor that may improve moisture resistance reliability and improve connectivity between internal and external electrodes.

SUMMARY

An aspect of the present disclosure is to improve moisture resistance reliability of a multilayer electronic component.

An aspect of the present disclosure is to improve connectivity between an internal electrode and an external electrode.

However, the object of the present disclosure is not limited to the above, and will be more easily understood in the process of describing specific embodiments of the present disclosure.

According to an aspect of the present disclosure, a multilayer electronic component includes a body including a dielectric layer and an internal electrode alternately disposed with the dielectric layer in a first direction; an external electrode disposed outside the body; and an oxide layer disposed between the body and the external electrode and connecting the internal electrode and the external electrode, wherein the oxide layer includes an Ni oxide, a Cu oxide, or both.

According to another aspect of the present disclosure, a multilayer electronic component includes a body including a dielectric layer and an internal electrode alternately disposed with the dielectric layer; an oxide layer contacting one surface of the body and comprises a metal oxide; and an external electrode disposed on the oxide layer, wherein at least one groove portion is disposed between the one surface of the body and an end of the internal electrode, and the oxide layer is in contact with the end of the internal electrode.

BRIEF DESCRIPTION OF DRAWINGS

The above and other aspects, features, and advantages of the present disclosure will be more clearly understood from the following detailed description, taken in conjunction with the accompanying drawings, in which:

FIG. 1 is a perspective view schematically illustrating a multilayer electronic component according to an embodiment of the present disclosure.

FIG. 2 is a cross-sectional view schematically illustrating a cross-section of FIG. 1, taken along line I-I'.

FIG. 3 is a cross-sectional view schematically illustrating a cross-section of FIG. 1, taken along line II-II'.

FIG. 4 is a cross-sectional view illustrating partially the body of FIG. 2 and schematically illustrating a detailed configuration of the body.

FIG. 5 is an enlarged view of portion K1 in FIG. 2.

FIG. 6 is an enlarged view of portion K2 in FIG. 2.

FIG. 7 is an enlarged view of portion K3 in FIG. 5.

FIG. 8 is a graph schematically illustrating an X-ray diffraction pattern for an oxide layer in Example and Comparative Example.

FIGS. 9 and 10 are cross-sectional views schematically illustrating a modified example of FIG. 2, and a multilayer electronic component according to another embodiment of the present disclosure.

DETAILED DESCRIPTION

Hereinafter, embodiments of the present disclosure will be described with reference to specific example embodiments and the attached drawings. The embodiments of the present disclosure may, however, be exemplified in many different forms and should not be construed as being limited to the specific embodiments set forth herein. The example embodiments disclosed herein are provided for those skilled in the art to better explain the present disclosure. In the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily illustrated for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

Multilayer Electronic Component

FIG. 1 is a perspective view schematically illustrating a multilayer electronic component according to an embodiment of the present disclosure.

FIG. 2 is a cross-sectional view schematically illustrating a cross-section of FIG. 1, taken along line I-I'.

FIG. 3 is a cross-sectional view schematically illustrating a cross-section of FIG. 1, taken along line II-II'.

FIG. 4 is a cross-sectional view illustrating partially the body of FIG. 2 and schematically illustrating a detailed configuration of the body.

FIG. 5 is an enlarged view of portion K1 in FIG. 2.

FIG. 6 is an enlarged view of portion K2 in FIG. 2.

FIG. 7 is an enlarged view of portion K3 in FIG. 5.

Hereinafter, a multilayer electronic component 100 according to an embodiment of the present disclosure will be described with reference to FIGS. 1 to 7. In addition, a multilayer ceramic capacitor (hereinafter referred to as 'MLCC') will be described as an example of the multilayer electronic component, but the present disclosure is not limited thereto, and may also be applied to various multilayer electronic components, such as an inductor, a piezoelectric element, a varistor, a thermistor, or the like.

A multilayer electronic component 100 according to an embodiment of the present disclosure may include a body 110 including a dielectric layer 111 and an internal electrode (121 and 122), an external electrode (131 and 132), and an oxide layer (141 and 142).

As described above, in the related art, as a dielectric layer 111 and an internal electrode (121 and 122) become thinner, a problem may occur in which moisture resistance reliability is reduced due to penetration of external moisture or the like. In addition, when fine metal powder particles are used to thin the internal electrode (121 and 122), a problem in which connectivity between the internal electrode (121 and 122) and an external electrode (131 and 132) is deteriorated may occur due to a difference in shrinkage behavior between the internal electrode (121 and 122) and the dielectric layer 111.

A multilayer electronic component 100 according to an embodiment of the present disclosure may include the oxide layer (141 and 142) disposed between the body 110 and the external electrode (131 and 132) to suppress penetration of external moisture or the like, and improve connectivity between the internal electrode (121 and 122) and the external electrode (131 and 132).

Hereinafter, each component included in a multilayer electronic component 100 according to an embodiment of the present disclosure will be described in more detail.

Although the detailed shape of the body 110 is not particularly limited, as illustrated, the body 110 may have a hexahedral shape or a shape similar thereto. Due to shrinkage of ceramic powder included in the body 110 during a sintering process or polishing of corners, the body 110 may not have a hexahedral shape with perfect straight lines, but may substantially have a hexahedral shape.

The body 110 may have first and second surfaces 1 and 2 opposing in a first direction, third and fourth surfaces 3 and 4 connected to the first and second surfaces 1 and 2 and opposing in a second direction, and fifth and sixth surfaces 5 and 6 connected to the first to fourth surfaces 1, 2, 3, and 4 and opposing in a third direction.

The body 110 may include the dielectric layer 111 and the internal electrode (121 and 122) alternately disposed with the dielectric layer 111. For example, the internal electrode (121 and 122) may be alternately disposed with the dielectric layer 111 in the first direction. A plurality of dielectric layers 111 forming the body 110 may be in a sintered state, and a boundary between adjacent dielectric layers 111 may be integrated to such an extent that it may be difficult to identify the same without using a scanning electron microscope (SEM).

The dielectric layer 111 may include, for example, a dielectric material, and the dielectric material may include $BaTiO_3$, or $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, $Ba(Ti_{1-y}Zr_y)O_3$ $(0<y<1)$, or the like, in which calcium (Ca), zirconium (Zr), or the like is partially dissolved in $BaTiO_3$, or the like, but the present disclosure is not limited thereto.

An average thickness td of the dielectric layer 111 does not need to be particularly limited, but may be, for example, 0.01 μm to 10 μm. In addition, the average thickness td of the dielectric layer 111 may be arbitrarily set depending on desired characteristics or use. For example, in small IT electronic component (for example, the electronic component that is mounted on the printed circuit board (PCB) of IT device), the average thickness td of at least one of the plurality of dielectric layers 111 may be 0.4 μm or less to achieve miniaturization and high capacitance.

In general, as a thickness of the dielectric layer 111 becomes thinner, insulation resistance may be easily deteriorated due to penetration of external moisture into the body 110, which reduces reliability of the multilayer electronic component. A multilayer electronic component 100 according to an embodiment of the present disclosure may include the oxide layer (141 and 142) disposed between the body 110 and the external electrode (131 and 132), such that reliability of the multilayer electronic component 100 can be secured even when the average thickness td of the dielectric layer is 0.4 μm or less.

The internal electrode (121 and 122) may be alternately disposed with the dielectric layer 111. For example, a first internal electrode 121 and a second internal electrode 122, which may be a pair of electrodes with different polarities, may be disposed to face each other with the dielectric layer 111 interposed therebetween. The first internal electrode 121 and the second internal electrode 122 may be electrically separated from each other by the dielectric layer 111 disposed therebetween.

The first internal electrode 121 may be disposed to be spaced apart from the fourth surface 4 and extend toward the third surface 3. The second internal electrode 122 may be disposed to be spaced apart from the third surface 3 and extend toward the fourth surface 4. The first internal electrode 121 may be electrically connected to a first external electrode 131 on the third surface 3, and the second internal electrode 122 may be electrically connected to a second external electrode 132 on the fourth surface 4.

A conductive metal included in the internal electrode (121 and 122) may be one or more of Ni, Cu, Pd, Ag, Au, Pt, Sn, W, Ti, and alloys thereof, and more preferably may include Ni, but the present disclosure is not limited thereto.

An average thickness te of the internal electrode (121 and 122) does not need to be particularly limited, but may be, for example, 0.01 μm to 3 μm or less. In addition, the average thickness te of the internal electrode (121 and 122) may be arbitrarily set depending on desired characteristics or use.

For example, in small IT electronic component, the average thickness te of at least one of the plurality of internal electrode (121 and 122) may be 0.4 μm or less to achieve miniaturization and high capacitance.

As described above, a multilayer electronic component 100 according to an embodiment of the present disclosure may include the oxide layer (141 and 142) disposed between the body 110 and the external electrode (131 and 132), to secure reliability of the multilayer electronic component 100, even when the average thickness te is 0.4 μm or less.

The average thickness td of the dielectric layer 111 and the average thickness te of the internal electrode (121 and 122) mean a size of the dielectric layer 111 and a size of the internal electrode (121 and 122) in the first direction, respectively. The average thickness td of the dielectric layer 111 and the average thickness te of the internal electrode (121 and 122) may be measured by scanning cross-sections of the body 110 in the first and second directions with a scanning electron microscope (SEM) at 10,000 magnifications. More specifically, the average thickness td of the dielectric layer 111 may be determined by measuring thicknesses at multiple points of one dielectric layer 111, for example, at 30 equally spaced points in the second direction. In addition, the average thickness te of the internal electrode (121 and 122) may be determined by measuring thicknesses at multiple points of one internal electrode (121 and 122), for example, at thirty 30 points equally spaced in the second direction. The thirty 30 equally spaced points may be designated in a capacitance formation portion Ac to be described later. In addition, when the value of the average thickness is determined by using measurements of average values to ten dielectric layers 111 and ten internal electrodes (121 and 122), the average thickness td of the dielectric layer 111 and the average thickness te of the internal electrode (121 and 122) may be more generalized.

The body 110 may include a capacitance formation portion Ac disposed in the body 110 and including the dielectric layer 111 and the first and second internal electrodes 121 and 122 alternately disposed, to form capacitance, and a first cover portion 112 and a second cover portion 113 respectively disposed on opposite surfaces of the capacitance formation portion Ac in the first direction. The cover portion (112 and 113) may basically serve to prevent damage to the internal electrodes due to physical or chemical stress. The cover portion (112 and 113) may have the same configuration as the dielectric layer 111 except that they do not include internal electrodes.

There may be no need to specifically limit thicknesses of the cover portion (112 and 113). To miniaturize and increase capacitance of the multilayer electronic component, an average thickness tc of the cover portion (112 and 113) may be 20 μm or less. As described above, the multilayer electronic component 100 according to an embodiment of the present disclosure may include the oxide layer (141 and 142) disposed between the body 110 and the external electrode (131 and 132) to secure reliability of the multilayer electronic component 100, even when the average thickness tc of the cover portion (112 and 113) is 20 μm or less. In this case, the average thickness of the cover portion (112 and 113) means an average thickness of the first cover portion 112 and an average thickness of the second cover portion 113, respectively.

The average thickness tc of the cover portion (112 and 113) may mean an average size of the cover portion (112 and 113) in the first direction, respectively, and may be an average value of sizes in the first direction, measured at five equally spaced points in the cross-section of the body 110 in the first and second directions.

The body 110 may include a first margin portion 114 and a second margin portion 115 respectively disposed on both sides of the capacitance formation portion Ac opposing each other in the third direction. For example, the margin portions 114 and 115 may refer to regions between both ends of the internal electrode (121 and 122) and a boundary surface of the body 110, in a cross-section of the body 110 cut in the first and third directions.

The margin portion (114 and 115) may include the same material as the dielectric layer 111 except that they do not include the internal electrode (121 and 122). The margin portion (114 and 115) may basically serve to prevent damage to the internal electrode (121 and 122) due to physical or chemical stress.

The average thickness of the margin portion (114 and 115) does not need to be particularly limited. To miniaturize and increase capacitance of the multilayer electronic component, the average thickness of the margin portion (114 and 115) may be 15 μm or less. As described above, the multilayer electronic component 100 according to an embodiment of the present disclosure may include the oxide layer (141 and 142) disposed between the body 110 and the external electrode (131 and 132), to secure reliability of the multilayer electronic component 100, even when the average thickness of the margin portion (114 and 115) is 20 μm or less. In this case, the average thickness of the margin portion (114 and 115) refers to an average thickness of the first margin portion 114 and an average thickness of the second margin portion 115, respectively.

The average thickness of the margin portion (114 and 115) may mean the average size of the margin portion (114 and 115) in the third direction, and may be an average value of sizes measured at five 5 equally spaced points in the cross-section of the body 110 in the first and third directions.

When a magnetic material is applied to the body 110, instead of a dielectric material, the multilayer electronic component may function as an inductor. The magnetic material may be, for example, ferrite and/or metallic magnetic particles. When the multilayer electronic component functions as an inductor, the internal electrode may be a coiled conductor.

Additionally, when a piezoelectric material is applied to the body 110, instead of a dielectric material, the multilayer electronic component may function as a piezoelectric element. The piezoelectric material may be, for example, lead zirconate titanate (PZT).

In addition, when a ZnO-based material or a SiC-based material is applied to the body 110, instead of a dielectric material, the multilayer electronic component may function as a varistor, and when a spinel-based material is applied to the body 110, instead of a dielectric material, the multilayer electronic component may function as a thermistor.

For example, a multilayer electronic component 100 according to an embodiment of the present disclosure may appropriately change a material or a structure of the body 110, to function as an inductor, a piezoelectric element, a varistor, or a thermistor as well as a multilayer ceramic capacitor.

The external electrode (131 and 132) may be disposed outside the body 110. Specifically, the external electrodes 131 and 132 may be disposed on the third and fourth surfaces 3 and 4 of the body 110, and may be disposed to extend on portions of the first, second, fifth, and sixth surfaces 1, 2, 5, and 6. The external electrodes 131 and 132 may include a first external electrode 131 disposed on the third surface 3 and electrically connected to the first internal electrode 121, and a second external electrode 132 disposed on the fourth surface 4 and electrically connected to the second internal electrode 122.

The external electrode (131 and 132) may include an electrode layer (131a and 132a) disposed on the oxide layer (141 and 142), and a plating layers 131b and 132b disposed on the electrode layer (131a and 132a). For example, the first external electrode 131 may include a first electrode layer 131a and a first plating layer 131b disposed on the first electrode layer 131a, and the second external electrode 132 may include a second electrode layer 132a and a second plating layer 132b disposed on the second electrode layer 132a.

The electrode layer (131a and 132a) may be, for example, a sintered electrode layer containing metal and glass. Alternatively, the electrode layer (131a and 132a) may be a conductive resin layer containing metal and a resin. Alternatively, the electrode layer (131a and 132a) may be a thin film layer formed by a thin film forming method such as sputtering, deposition, or the like. The electrode layer (131a and 132a) may be preferably the sintered electrode layer, but the present disclosure is not limited thereto, and the electrode layer (131a and 132a) may include one or more of the sintered electrode layer, the conductive resin layer, and the thin film layer.

The metal included in the electrode layer (131a and 132a) may include Cu, Ni, Sn, Pd, Pt, Au, Ag, Pb, and/or alloys containing the same, and more preferably include Cu, but, the present disclosure is not limited thereto.

The plating layer (131b and 132b) may improve mounting characteristics. A type of the plating layer (131b and 132b) is not particularly limited, and may be a plating layer containing Ni, Sn, Pd, and/or an alloy containing these, and may be formed as a plurality of layers. The plating layer (131b and 132b) may be, for example, an Ni plating layer or an Sn plating layer, or may be formed by sequentially forming an Ni plating layer and an Sn plating layer. Additionally, the plating layer (131b and 132b) may include a plurality of Ni plating layers and/or a plurality of Sn plating layers.

Although the drawing illustrates a structure in which the multilayer electronic component 100 has two external electrodes 131 and 132, the structure is not limited thereto, and the number, shapes, or the like of the external electrodes 131 and 132 may be changed depending on forms, other purposes, or the like of the internal electrodes 121 and 122.

For example, the oxide layer (141 and 142) may be disposed between the body 110 and the external electrode (131 and 132) to connect the internal electrode (121 and 122) and the external electrode (131 and 132). The oxide layer (141 and 142) may include a first oxide layer 141, disposed between the body 110 and the first external electrode 131 to connect the first internal electrode 121 and the first external electrode 131, and a second oxide layer 142 disposed between the body 110 and the second external electrode 132 to connect the second internal electrode 122 and the second external electrode 132.

For example, the oxide layer (141 and 142) may be in contact with one surface of the body 110, and the external electrode (131 and 132) may be disposed on the oxide layer (141 and 142). For example, the oxide layer (141 and 142) may include the first oxide layer 141 contacting the third surface 3 of the body 110, and the second oxide layer 142 contacting the fourth surface 4 of the body 110, and the first external electrode 131 may be disposed on the first oxide layer 141, and the second external electrode 132 may be disposed on the second oxide layer 142.

More specifically, the oxide layer (141 and 142) may include the first oxide layer 141 covering the third surface 3, and the second oxide layer 142 spaced apart from the first oxide layer 141 and covering the fourth surface 4. The first and second oxide layers 141 and 142 may be disposed between an extension line E1 of the first surface and an extension line E2 of the second surface, but the present disclosure is not limited thereto.

When a voltage is applied, the oxide layer (141 and 142) may electrically connect the internal electrode (121 and 122) and the external electrode (131 and 132) through a tunneling effect. The tunneling effect refers to a phenomenon in which electrons may move between metals at a metal-insulator-metal junction. When a voltage above a certain level is applied to an insulator, electrons may tunnel through the insulator and may move between metals. For example, when an electric field of a certain magnitude or greater is applied, electrons may tunnel through the oxide layer (and may move between the internal electrode (121 and 122) and the external electrode (131 and 132). This tunneling effect appears because the oxide layer (141 and 142) is formed into a thin film using a sol-gel method, which will be described later.

The oxide layer (141 and 142) may include a metal oxide. The oxide layer (141 and 142) may be formed using a sol-gel method, as will be described later. There may be no need to specifically limit a type of metal oxide contained in the oxide layer (141 and 142). The metal oxide may be appropriately selected considering reactivity and dispersibility of a metal precursor used in the sol-gel method, moisture resistance and tunneling characteristics of the metal oxide, or the like. For example, the metal oxide may include one or more of an Ni oxide and a Cu oxide. The oxide layer (141 and 142) may basically include the metal oxide to prevent external moisture or the like from penetrating into the internal electrode (121 and 122), thereby improving moisture resistance reliability of the multilayer electronic component 100.

Additionally, the oxide layer (141 and 142) may improve connectivity between the internal electrode (121 and 122) and the external electrode (131 and 132). Referring to FIGS. 2 and 4, the body 110 may include at least one groove (G1 and G2) disposed between one surface of the body 110 contacting the oxide layer (141 and 142) and an end of the internal electrode (121 and 122). More specifically, at least one first groove G1 may be disposed between the third surface 3 contacting the first oxide layer 141 and an end of the first internal electrode 121, and at least one second groove G2 may be disposed between the fourth surface 4 contacting the second oxide layer 142 and an end of the second internal electrode 122. The groove (G1 and G2) may be formed by a difference in shrinkage behavior between the internal electrode (121 and 122) and the dielectric layer 111 during a sintering process of the body 110. When a sintering shrinkage rate of the internal electrode (121 and 122) is greater than a sintering shrinkage rate of the dielectric layer 111, a problem in which connectivity between the internal electrode (121 and 122) and the external electrode (131 and 132) is reduced due to the groove (G1 and G2) may occur.

According to an embodiment of the present disclosure, the oxide layer (141 and 142) may be in contact with an end of the internal electrode (121 and 122) in the groove (G1 and G2), to improve connectivity between the internal electrode (121 and 122) and the external electrode (131 and 132). In a process using the sol-gel method, which will be described later, during a process of coating an outer surface of the body 110 with a solution for forming an oxide layer in which a metal precursor and an organic solvent are mixed, the solution may be easily applied into the groove (G1 and G2). Therefore, after a heat treatment process, during a process of forming the oxide layer (141 and 142), connectivity between the internal electrode (121 and 122) and the external electrode (131 and 132) may be secured without a separate polishing process.

Hereinafter, the oxide layer (141 and 142) will be described in more detail with reference to FIGS. 5 to 7. FIGS. 5 to 7 illustrate the first oxide layer 141. Although there are differences that the first oxide layer 141 is disposed on the third surface 3 and the second oxide layer 142 is disposed on the fourth surface 4, the first oxide layer 141 and the second oxide layer 142 may have substantially the same configuration. Therefore, description of the first oxide layer 141 will be considered to include description of the second oxide layer 142.

As illustrated in FIGS. 5 and 6, the first oxide layer 141 may include a first region 141a continuously disposed on the third surface 3 and forming a single layer, and at least one second region 141b extending from the first region 141a into the first groove G1 and contacting an end of the first internal electrode 121.

Additionally, referring to FIG. 5, a size L1 of the second region 141b in the second direction does not need to be particularly limited, but may be, for example, greater than 0 nm and less than or equal to 200 nm. Since the groove (G1 and G2) may be formed by differences in shrinkage behavior of the dielectric layer 111 and the internal electrode (121 and 122) during a sintering process of the body 110, sizes L1 of the grooves G1 and G2 in the second direction may be different from each other, and the sizes L1 of the grooves G1 and G2 in the second direction may be determined randomly regardless of where the grooves (G1 and G2) are disposed in the first direction.

Additionally, as illustrated in FIG. 2, the groove (G1 and G2) may not be disposed on end sides of at least one internal electrode (121 and 122). For example, in cross-sections in the first and second directions cut from a center of the body 110 in the third direction, a ratio of the number of grooves G1 and G2 to the total number of internal electrodes 121 and 122 may be, for example, 30% to 70%. For example, in the cross-sections in the first and second directions cut from the center of the body 110 in the third direction, a ratio of the number of first grooves G1 to the total number of first internal electrodes 121 may be 30% to 70%, and a ratio of the number of second grooves G2 to the total number of second internal electrodes 122 may be 30% to 70%. A ratio of the number of the grooves G1 and G2 may be determined, in images of cross-sections in the first and second directions cut from the center of the body 110 in the third direction using a scanning electron microscope (SEM), as a ratio of the number of grooves G1 and G2 to the total number of internal electrode 121 and 122 present in a portion of the body 110, for example, in an enlarged central region in the first direction, it may be measured in the enlarged area.

In an embodiment, the oxide layer (141 and 142) may include spherical nanoparticles of metal oxide. For example, the oxide layer (141 and 142) may include one or more spherical nanoparticles of an Ni oxide and a Cu oxide. For example, as illustrated in FIG. 7, the first oxide layer 141 may have a form in which spherical nanoparticles NPs of metal oxide are aggregated. The spherical nanoparticles (NPs) may be a structural feature appearing when synthesizing metal oxides using a sol-gel method. Since the oxide layer (141 and 142) has an agglomerated form of spherical nanoparticles NPs of metal oxide, it may be advantageous for thinning the oxide layer (141 and 142) and effectively suppressing infiltration of external moisture.

An average diameter of spherical nanoparticles NPs may be, for example, 4 nm to 20 nm, and more preferably 5 nm to 10 nm. When the average diameter of the spherical nanoparticles NPs falls within the above range, effects of thinning the oxide layer (141 and 142) and suppressing penetration of external moisture may become more significant.

The average diameter of the spherical nanoparticles NPs may refer to, for example, an average value of diameters of spherical nanoparticles obtained by obtaining an image from cross-sections of the oxide layer (141 and 142) in the first and second directions cut from the center of the body 110 in the third direction using a scanning electron microscopy SEM at ×50,000 magnification, and analyzing the image using an image analysis program, for example, Zootos Program from Zootos. Other methods and/or tools appreciated by one of ordinary skill in the art, even if not described in the present disclosure, may also be used.

In an embodiment, the oxide layer (141 and 142) include an Ni oxide, and may satisfy $I_1>I_2$, where, in an X-ray diffraction pattern for the oxide layer, $I_1$ is an intensity of a diffraction peak for a (111) crystal plane, and $I_2$ is an intensity of a diffraction peak for a (200) crystal plane. More specifically, the oxide layer (141 and 142) may be preferentially oriented toward the (111) crystal plane. $I_1$ and $I_2$ may be changed depending on a heat treatment temperature, a heat treatment time, or the like, but when the oxide layer (141 and 142) is formed by a sol-gel method, $I_1>I_2$ may be satisfied by heat treatment at a temperature of 200° C. to 500° C. for approximately 1 hour.

FIG. 8 is a graph schematically illustrating an X-ray diffraction pattern for an oxide layer in Example and Comparative Example. More specifically, the Example illustrates an X-ray diffraction pattern for an Ni oxide formed with a sol-gel method according to an embodiment of the present disclosure, and the Comparative Example illustrates an X-ray diffraction pattern for an Ni oxide formed by heat treatment of metal Ni in a temperature of 100° C. to 300° C. Referring to FIG. 8, it can be seen that an embodiment of the present disclosure satisfies $I_1>I_2$, but the comparative example satisfies $I_1<I_2$.

An average thickness to of the oxide layer (141 and 142) does not need to be particularly limited. In an embodiment, the average thickness to of the oxide layer (141 and 142) may be 20 nm or more and 50 nm or less. When the average thickness to of the oxide layer (141 and 142) is less than 20 nm, an effect of improving moisture resistance reliability of the present disclosure may be minimal. Additionally, when the average thickness to of the oxide layer (141 and 142) is greater than 50 nm, ESR of the multilayer electronic component 100 may excessively increase. The average thickness to of the oxide layer (141 and 142) may be sufficient if it may be 20 nm or more. However, when the average thickness to of the oxide layer (141 and 142) is less than 30 nm, in a process of forming the oxide layer (141 and 142), since a solution for forming the oxide layer may not be uniformly applied to the third and fourth surfaces 3 and 4 of the body 110, thickness uniformity of the oxide layer (141 and 142) may be reduced. Therefore, it is more preferable that the average thickness to of the oxide layer (141 and 142) may be 30 nm or more and 50 nm or less.

The average thickness to of the oxide layer (141 and 142) may mean an average size of the oxide layer (141 and 142) in the second direction, and may be an average value of sizes in the second direction measured at five equally spaced points in the first direction from cross-sections of the oxide layer (141 and 142) in the first and second directions cut from a center of the body 110 in the third direction. In this case, a thickness of the oxide layer (141 and 142) refers to a distance in the second direction between an inner surface of the oxide layer (141, 142) contacting one surface of the body 110 and an outer surface of the oxide layer (141 and 142) contacting the external electrode (131 and 132).

Referring to FIGS. 5 and 6, in an embodiment, t2/t1 may be 0.9 or more and 1.0 or less in which t1 is a thickness of the oxide layer 141 measured at a central region of the body 110 in the first direction, and t2 is a thickness of the oxide layer 141 measured at the internal electrode 121 disposed at an outermost portion of the body 110 in the first direction. That is, the oxide layer 141 may have a uniform thickness in the first direction to ensure moisture resistance reliability without excessively increasing ESR of the multilayer electronic component 100. t1 and t2 may mean sizes of the oxide layer (141 and 142) in the second direction, and may be measured from images of cross-sections of the oxide layer (141 and 142) in the first and second directions cut from the center of the body 110 in the third direction by using a scanning electron microscope (SEM). Other methods and/or tools appreciated by one of ordinary skill in the art, even if not described in the present disclosure, may also be used.

FIGS. 9 and 10 are cross-sectional views schematically illustrating a modified example of FIG. 2, and a multilayer electronic component according to another embodiment of the present disclosure. Hereinafter, another embodiment of the present disclosure will be described with reference to FIGS. 9 and 10. However, descriptions overlapping the above-described embodiment of the present disclosure will be omitted.

Referring to FIG. 9, a first oxide layer 141' may cover a portion of a third surface 3, and a second oxide layer 142' may cover a portion of a fourth surface 4. Therefore, the first and second oxide layers 141' and 142' may be disposed between an extension line E1 of a first surface and an extension line E2 of a second surface.

In this case, process efficiency may be improved by controlling a coating amount of a solution used in a sol-gel method while ensuring an effect of improving connectivity between an internal electrode (121 and 122) and an external electrode (131 and 132).

Referring to FIG. 10, a first oxide layer 141" may cover a third surface 3, and a second oxide layer 142" may cover a fourth surface 4. The oxide layers 141" and 142" may be disposed to extend on portions of first and second surfaces 1 and 2.

In this case, since the oxide layers 141" and 142" may also cover the portions of the first and second surfaces 1 and 2, an effect of improving moisture resistance reliability may be more significant.

Hereinafter, an example of a manufacturing method of the above-described multilayer electronic component 100 will be described.

First, a ceramic powder for forming a dielectric layer 111 may be prepared. The ceramic powder is not particularly limited as long as sufficient capacitance is obtained, but for example, a barium titanate-based material, a lead composite perovskite-based material, a strontium titanate-based material, or the like may be used. Examples of the ceramic powder may include $BaTiO_3$, or $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), $Ba(Ti_{1-y}Zr_y)O_3$ ($0<y<1$), or the like, in which calcium (Ca), zirconium (Zr), or the like is partially dissolved in $BaTiO_3$. Among ceramic powder particles, $BaTiO_3$ may be synthesized, for example, by reacting a titanium raw material such as titanium dioxide or the like with a barium raw material such as barium carbonate or the like. A method for synthesizing the ceramic powder may include, for example, a solid phase method, a sol-gel method, a hydrothermal synthesis method, or the like, but the present disclosure is not limited thereto.

Next, after drying and pulverizing the prepared ceramic powder, a ceramic slurry may be prepared by mixing an organic solvent such as ethanol or the like and a binder such as polyvinyl butyral or the like, and the ceramic slurry may be applied on a carrier film, and drying the same to prepare a ceramic green sheet.

Next, a conductive paste for an internal electrode containing a metal powder, a binder, or the like may be printed on the ceramic green sheet using a screen printing method, a gravure printing method, or the like in a predetermined thickness to form an internal electrode pattern.

Thereafter, the ceramic green sheet on which the internal electrode pattern is printed may be peeled off from the carrier film, ceramic green sheets on which the internal electrode pattern is printed may be stacked by a predetermined number of layers, to form a stack body, and the stack body may be cut into a predetermined chip size. To form a cover portion (112 and 113) after sintering, ceramic green sheets on which internal electrode pattern is not printed may be stacked by a predetermined number of layers on upper and lower portions of the stack body in the first direction. In addition, to form a margin portion (114 and 115) after sintering, a conductive paste for internal electrode may be applied on the ceramic green sheet except for a region in which the margin portion (114 and 115) is formed, or a separate ceramic green sheet may also be stacked on a cross-section of the cut chip in the third direction.

A binder or the like included in the cut chip may be removed preferably by a binder removal process. Conditions of the binder removal process may be changed depending on a type of binder used, and are not particularly limited. For example, the binder removal process may be carried out at 180° C. or higher and 450° C. or lower for a time period of 0.5 hours or more and 24 hours or less.

Thereafter, the chip in which the binder removal process is performed may be sintered at a temperature of 1100° C. or more and 1300° C. or less, to form a body 110 including a dielectric layer 111 and an internal electrode (121 and 122). In this case, during the sintering process, a groove (G1 and G2) may be formed due to a difference in sintering shrinkage between the internal electrode (121 and 122) and the dielectric layer 111.

Next, an oxide layer (141 and 142) may be formed by a sol-gel method. First, a solution for forming the oxide layer may be prepared by mixing a metal precursor and an organic solvent such as methanol or the like. A type of the metal precursor does not need to be particularly limited, and may be changed depending on a type of a target metal oxide. For example, when a metal oxide included in the oxide layer (141 and 142) includes an Ni oxide, the metal precursor may include nickel acetate tetrahydrate ($(Ni(CH_3CO_2)_2 \cdot 4H_2O)$). For example, when the metal oxide included in the oxide layer (141 and 142) includes a Cu oxide, the metal precursor may be copper acetate monohydrate ($Cu(CH_3COO)_2 \cdot H_2O$), but the present disclosure is not limited thereto.

An amount of the metal precursor may be 1 wt % to 30 wt %, based on 100 wt % of the solution for forming the oxide layer, but the present disclosure is not limited thereto.

The solution for forming the oxide layer may be applied and dried on the third and fourth surfaces 3 and 4 of the body 110 using a method such as spin coating, spray coating, or the like. In this case, the solution for forming the oxide layer may also be applied into the groove (G1 and G2). Next, an oxidation reaction may be induced by heat treatment at a temperature of 200° C. to 500° C. for about 1 hour, to form the oxide layer (141 and 142) containing the metal oxide.

Next, an external electrode (131 and 132) may be formed.

When the electrode layer (131a and 132a) is a sintered electrode layer, the third and fourth surfaces 3 and 4 of the body 110 may be dipped in a conductive paste containing a metal powder and glass, and may be then sintered to form an electrode layer (131a and 132a). In this case, a sintering temperature may be, for example, 700° C. to 900° C.

When the electrode layer (131a and 132a) is a conductive resin layer, a conductive resin composition containing a metal powder and a thermosetting resin such as an epoxy resin or the like may be applied and dried on the body 110, and may be then cured and heat treated at a temperature of 250° C. to 550° C. to form the electrode layer (131a and 132a). Additionally, when the electrode layer (131a and 132a) is a thin film layer, the electrode layer (131a and 132a) may be formed using a sputtering method, a deposition method, or the like.

A method of forming the plating layer (131b and 132b) does not need to be particularly limited, and for example, electrolytic plating and/or electroless plating, or the like may be used.

However, the above-described manufacturing method is illustrative, and a manufacturing method of the multilayer electronic component 100 is not limited to the above-described manufacturing method.

EXPERIMENTAL EXAMPLE

First, $BaTiO_3$ powder particles, an organic solvent such as ethanol or the like, and a binder such as polyvinyl butyral or the like were mixed to prepare a ceramic slurry, and then the ceramic slurry was applied and dried on a carrier film to prepare a ceramic green sheet.

Next, a conductive paste for internal electrodes containing an Ni powder, a binder, and the like in a predetermined thickness was printed to form an internal electrode pattern on the ceramic green sheet, and ceramic green sheets having the internal electrode pattern were stacked and cut.

Next, after performing a binder removal process and a sintering process to form a body 110, a solution for forming an oxide layer, a mixture of nickel acetate tetrahydrate $((Ni(CH_3CO_2)_2 \cdot 4H_2O))$ and methanol, was spray coated on the body 110 and then dried. Next, heat treatment was performed at a temperature of 400° C. for about 1 hour to form oxide layers 141 and 142 containing an Ni oxide.

Next, the body 110 was dipped in a conductive paste containing Cu powder particles and glass, and then sintered to form electrode layers 131a and 132a, and a Ni plating layer and a Sn plating layer may be sequentially formed on the electrode layers to prepare plating layers 131b and 132b. Therefore, an experimental example was prepared.

In this case, an average thickness of the oxide layers 141 and 142 was adjusted by adjusting weight of nickel acetate tetrahydrate $((Ni(CH_3CO_2)_2 \cdot 4H_2O)$, a metal precursor, based on 100 wt % of the solution for forming the oxide layer for each sample number in Table 1 below. As the weight of nickel acetate tetrahydrate $((Ni(CH_3CO_2)_2 \cdot 4H_2O)$ increases, based on 100 wt % of the solution for forming the oxide layer, the average thickness of the oxide layer (141 and 142) increased.

Thereafter, average values of ESR values measured by applying a voltage of 1 V at a frequency of 1 kHz to 30 sample chips for each sample number were listed in Table 1 below. In addition, to evaluate moisture resistance reliability, after applying a voltage of 1.5 Vr for 12 hours in an environment of 85° C. and 85% relative humidity to 400 sample chips for each sample number, cases where burnt occurred and insulation resistance was 0Ω even in one sample were judged to be defective (X), and cases where none of them occurred were judged to be normal (○), and were listed in Table 1 below.

TABLE 1

| Sample No. | Oxide Layer Thickness (nm) | ESR (mΩ) | Humidity Resistance Reliability Evaluation |
|---|---|---|---|
| 1 | 10 | 8 | X |
| 2 | 20 | 9 | ○ |
| 3 | 30 | 9 | ○ |
| 4 | 40 | 10 | ○ |
| 5 | 50 | 14 | ○ |
| 6 | 60 | 35 | ○ |

Referring to Table 1, it can be seen that, in Sample No. 6, an average thickness of the oxide layer exceeded 50 nm, and ESR rapidly increased. Additionally, it can be seen that, in Sample No. 1, ESR was good, but moisture resistance reliability was poor.

It can be seen that, in Sample No. 2 to 5 had an average thickness of the oxide layer of 20 nm to 50 nm, and both ESR and moisture resistance reliability were good.

The present disclosure is not limited by the above-described embodiments and accompanying drawings, but is intended to be limited by the appended claims. Therefore, various forms of substitution, modification, and change will be possible by those skilled in the art within the scope of the technical spirit of the present disclosure described in the claims, and this will also be said to fall within the scope of the present disclosure.

In addition, the expression 'an embodiment' does not indicate the same embodiment, and is provided to emphasize and describe different unique characteristics. However, an embodiment presented above is not excluded from being implemented in combination with features of another embodiment. For example, even if a matter described in one detailed embodiment is not described in another embodiment, and it can be understood as a description related to another embodiment, unless there is a description contradicting or contradicting the matter in another embodiment.

In addition, expressions such as first and second are used to distinguish one component from another, and do not limit the order and/or importance of the components. In some cases, without departing from the scope of rights, a first element may be named a second element, and similarly, a second element may be named a first element.

As one of many effects of the present disclosure, moisture resistance reliability of a multilayer electronic component may be improved.

As one of many effects of the present disclosure, connectivity between an internal electrode and an external electrode may be improved.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including a dielectric layer and an internal electrode alternately disposed with the dielectric layer in a first direction;
an external electrode disposed outside the body; and
an oxide layer disposed between the body and the external electrode and connecting the internal electrode and the external electrode,
wherein the oxide layer includes an Ni oxide, a Cu oxide, or both,
wherein an average thickness of the oxide layer is greater than 0 nm and 50 nm or less.

2. The multilayer electronic component of claim 1, wherein the oxide layer comprises spherical nanoparticles of the Ni oxide, the Cu oxide, or both.

3. The multilayer electronic component of claim 2, wherein an average diameter of the spherical nanoparticles is 4 nm to 20 nm.

4. The multilayer electronic component of claim 1, wherein the oxide layer comprises the Ni oxide,
wherein the oxide layer satisfies $I_1 > I_2$, where, in an X-ray diffraction pattern of the oxide layer, $I_1$ is an intensity of a diffraction peak of a (111) crystal plane, and $I_2$ is an intensity of a diffraction peak of a (200) crystal plane.

5. The multilayer electronic component of claim 1, wherein the body comprises at least one groove portion disposed between one surface of the body contacting the oxide layer and an end of the internal electrode, and
wherein the oxide layer is in contact with the end of the internal electrode.

6. The multilayer electronic component of claim 1, wherein the body has first and second surfaces opposing in the first direction, third and fourth surfaces opposing each other in a second direction and connected to the first and second surfaces, and fifth and sixth surfaces opposing each other in a third direction and connected to the first to fourth surfaces, and
wherein the oxide layer comprises a first oxide layer covering the third surface and a second oxide layer spaced apart from the first oxide layer and covering the fourth surface.

7. The multilayer electronic component of claim 6, wherein the first and second oxide layers are arranged between an extension line of the first surface and an extension line of the second surface.

8. The multilayer electronic component of claim 6, wherein the first and second oxide layers are disposed to extend on a portion of the first surface and a portion of the second surface.

9. The multilayer electronic component of claim 1, wherein an average thickness of the oxide layer is 20 nm or more and 50 nm or less.

10. The multilayer electronic component of claim 9, wherein an average thickness of the oxide layer is 30 nm or more and 50 nm or less.

11. The multilayer electronic component of claim 1, wherein t2/t1 is 0.9 or more and 1.0 or less in which t1 is a thickness of the oxide layer measured at a central region of the oxide layer in the first direction, and t2 is a thickness of the oxide layer measured at an end portion of the oxide layer adjacent to the internal electrode disposed at an outermost portion of the body in the first direction.

12. The multilayer electronic component of claim 1, wherein the oxide layer covers at least a portion of the dielectric layer and at least a portion of the internal electrode.

13. The multilayer electronic component of claim 1, wherein the oxide layer extends from a first corner of the body to a second corner of the body.

14. The multilayer electronic component of claim 6, wherein the oxide layer is not disposed on the first surface.

15. The multilayer electronic component of claim 8, wherein at least a portion of the first surface is exposed.

16. A multilayer electronic component comprising:
a body including a dielectric layer and an internal electrode alternately disposed with the dielectric layer;
an oxide layer contacting one surface of the body and comprises a metal oxide; and
an external electrode disposed on the oxide layer,
wherein at least one groove portion is disposed between the one surface of the body and an end of the internal electrode, and
the oxide layer is in contact with the end of the internal electrode,
wherein an average thickness of the oxide layer is greater than 0 nm and 50 nm or less.

17. The multilayer electronic component of claim 16, wherein the oxide layer comprises spherical nanoparticles of the metal oxide.

18. The multilayer electronic component of claim 16, wherein the metal oxide comprises an Ni oxide, and
wherein the oxide layer satisfies $I_1 > I_2$, where, in an X-ray diffraction pattern of the oxide layer, $I_1$ is an intensity of a diffraction peak of a (111) crystal plane, and $I_2$ is an intensity of a diffraction peak of a (200) crystal plane.

* * * * *